United States Patent [19]

Inagaki et al.

[11] Patent Number: 5,140,141
[45] Date of Patent: Aug. 18, 1992

[54] BAR-CODE READER WITH READING ZONE INDICATOR

[75] Inventors: Masahiro Inagaki, Chiryu; Osamu Asai, Nagoya; Yasuyuki Sakai, Kariya, all of Japan

[73] Assignee: Nippondenso Co., Ltd., Kariya, Japan

[21] Appl. No.: 581,217

[22] Filed: Sep. 12, 1990

[30] Foreign Application Priority Data

Sep. 12, 1989 [JP] Japan ................................. 1-236327

[51] Int. Cl.⁵ .............................................. G06K 7/10
[52] U.S. Cl. ................................. 235/462; 235/470; 235/467
[58] Field of Search ..................... 235/462, 467, 470

[56] References Cited

U.S. PATENT DOCUMENTS

| | | | |
|---|---|---|---|
| 4,235,504 | 11/1980 | Ikeda et al. | |
| 4,678,288 | 7/1987 | Lonsdale et al. | |
| 4,939,356 | 7/1990 | Rando et al. | 235/470 X |
| 4,960,985 | 10/1990 | Knowles | 235/470 X |

FOREIGN PATENT DOCUMENTS

| | | |
|---|---|---|
| 56-168285 | 12/1981 | Japan . |
| 59-187315 | 10/1984 | Japan . |
| 61-36722 | 2/1986 | Japan . |
| 61-45216 | 3/1986 | Japan . |
| 61-128383 | 6/1986 | Japan . |
| 63-149774 | 6/1988 | Japan . |
| 63-150777 | 6/1988 | Japan . |
| 63-192175 | 8/1988 | Japan . |

*Primary Examiner*—David Trafton
*Attorney, Agent, or Firm*—Cushman, Darby & Cushman

[57] ABSTRACT

A bar-code reader for reading bar codes on articles or commodities in supermarkets or retail stores has a scanning unit mounted on a vertically movable support post assembly and including a scanning system which emits a scanning light beam and detects light reflected from a bar code. The bar-code reader includes various indicating members, such as an indicator rod, an indicator ring, an arrow mark, a pattern mark, and a colored sheet, for indicating to the operator a direction, a position, and an area or zone in which to pass an article with a bar code in order for the bar code to be successfully read by the scanning system.

26 Claims, 7 Drawing Sheets

BAR-CODE READER WITH READING ZONE INDICATOR

BACKGROUND OF THE INVENTION

The present invention relates to a bar-code reader, and more particularly to a device for reading a bar code that is spaced from a scanning unit.

One bar-code reader, also known as a bar-code scanner, for use in supermarkets or the like is disclosed in Japanese Laid-Open Patent Publication No. 63(1988)-192175.

The bar-code reader can automatically read a bar code attached to an article or commodity when the operator simply moves the article quickly through a certain region in the bar-code reader. The bar-code reader is effective in lessening any physical and mental fatigue which the operator would otherwise suffer from operating on a cash register or the like.

The disclosed bar-code reader has a scanning unit which is positioned remotely from a bar code to be read. With such an arrangement, the operator finds it difficult to recognize an area or zone in which the bar-code reader can read bar codes. Scanning light which is emitted from the bar-code reader is sometimes inclined toward the direction in which articles with bar codes move when the bar codes are to be read. The inclined scanning light however makes it more difficult for the operator to spot the bar-code reading zone.

In supermarkets or retail stores, the operator of a bar-code reader moves an article transversely through a bar-code reading zone, during which time the bar-code reader enters information represented by a bar code applied to the article. If the bar-code reader fails to read the bar code for some reason, the operator moves the article again through the bar-code reading zone, giving the bar-code reader another chance to read the bar code. If the operator recognizes a position or zone in which the bar-code reader can read bar codes most effectively, then the operator is able to direct an article toward that position or zone so that the bar-code reader can reliably read the bar code on the article.

SUMMARY OF THE INVENTION

In view of the aforesaid problems of the conventional bar-code reader, it is an object of the present invention to provide a bar-code reader which allows the operator to recognize a position, an area or zone, or a direction in which bar-code reader can read bar codes, or a position through which an article with a bar code is to move, so that the bar-code reader can successfully read bar codes at an increased rate.

According to the present invention, the above object can be achieved by a bar-code reader for reading a bar code attached to an article, comprising a scanning unit which comprises a vertical support with a path along which the article is to be moved being defined on one side thereof, scanning means supported on the support above the path, for emitting a scanning light beam to optically scan the bar code toward the path and deflecting the scanning light beam along a predetermined scanning pattern, and detecting means for detecting light reflected by the bar code which is optically scanned by the scanning light beam while the article is being moved along the path, and indicating means for indicating a zone through which the article is to be moved along the path.

The indicating means may comprise an indicator rod, an indicator ring, an arrow mark, a pattern mark, or a sheet, or a combination thereof.

The above and other objects, features and advantages of the present invention will become more apparent from the following description when taken in conjunction with the accompanying drawings in which preferred embodiments of the present invention are shown by way of illustrative example.

DETAILED DESCRIPTION

Like or corresponding parts are denoted by like or corresponding reference numerals throughout views.

Figure 1:
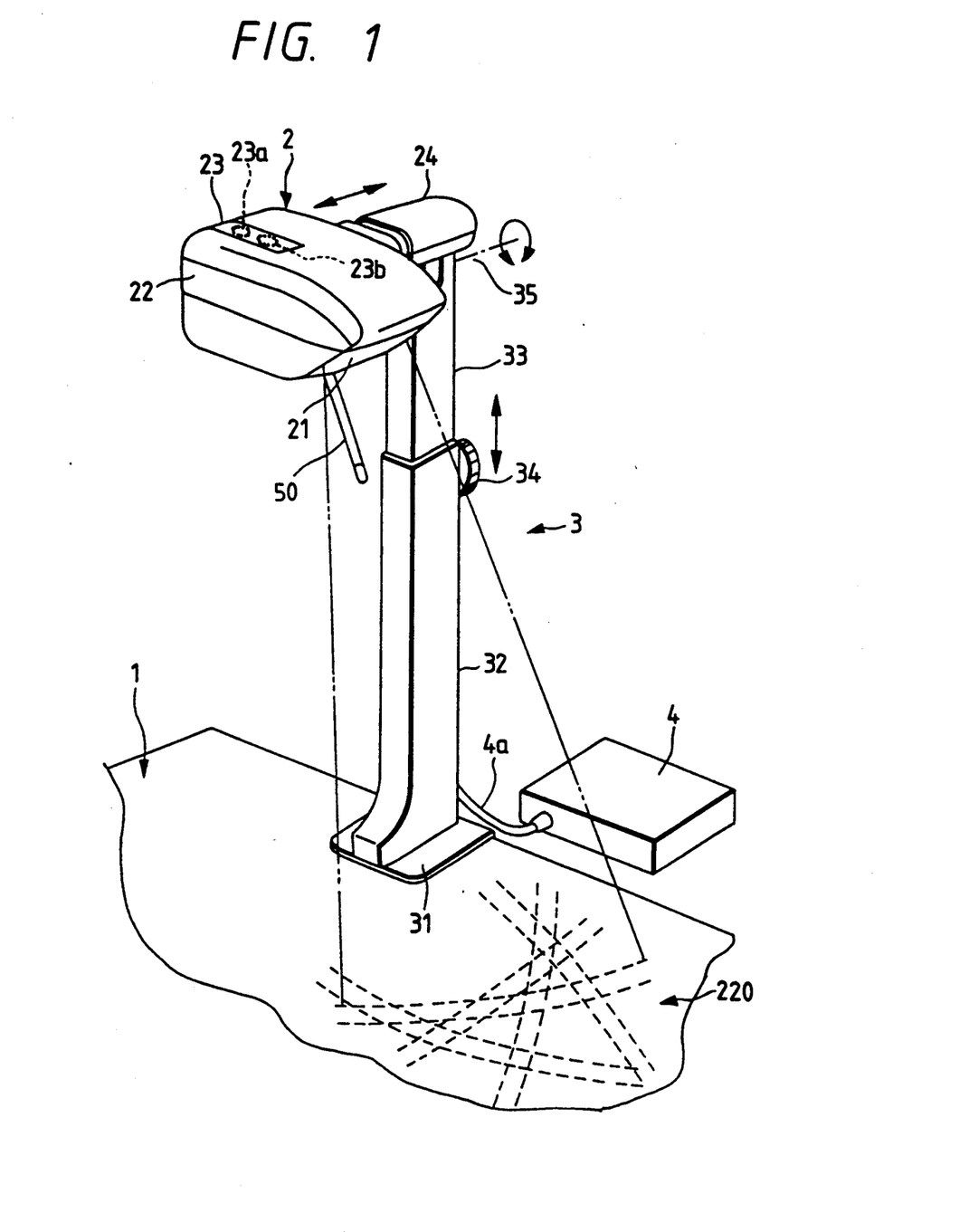
FIG. 1 is a perspective view of a bar-code reader according to a first embodiment of the present invention.

As shown in FIG. 1, a bar-code reader according to a first embodiment of the present invention includes a scanning unit 2 supported on a register counter table 1 by a support post assembly 3. The scanning unit 2 is electrically connected to a control circuit 4 through a cable 4a extending through the support post assembly 3. The scanning unit 2 is supplied with signals for energizing a laser beam source and a motor (described later on), a readout signal, and electric power through the cable 4a.

The support post assembly 3 comprises a base 31 fixedly mounted on the register counter table 1 a first tubular support post 32 vertically fixed to the base 31, and a second support post 33 vertically movably inserted in the first support post 32.

The second support post 33 inserted in the first support post 32 can be secured to the first support post 32 in any vertical position by a knob 34. The scanning unit 2 is supported on the upper end of the second support post 33 for angular movement about a horizontal axis 35.

The scanning unit 2 comprises a casing 22 having a readout window 21 and an arm 24 by which the casing 22 is coupled to the second support post 33. The arm 24 is horizontally extensible and contractable for thereby moving the casing 22 horizontally back and forth, i.e., toward and away from the upper end of the second support post 33. The casing 22 has an indicator rod 50 attached to a lower portion thereof.

Figure 2:
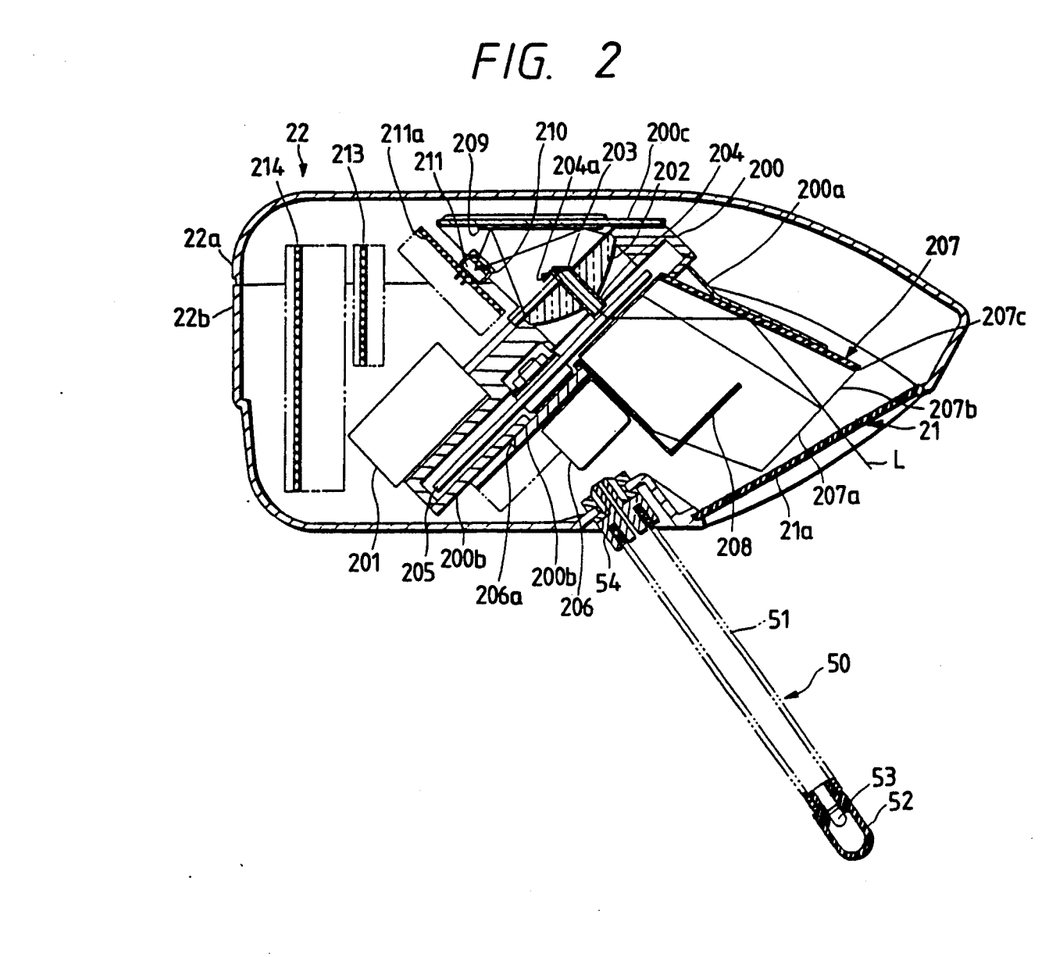
FIG. 2 is a cross-sectional view of a scanning unit of the bar-code reader shown in FIG. 1.
Figure 3:
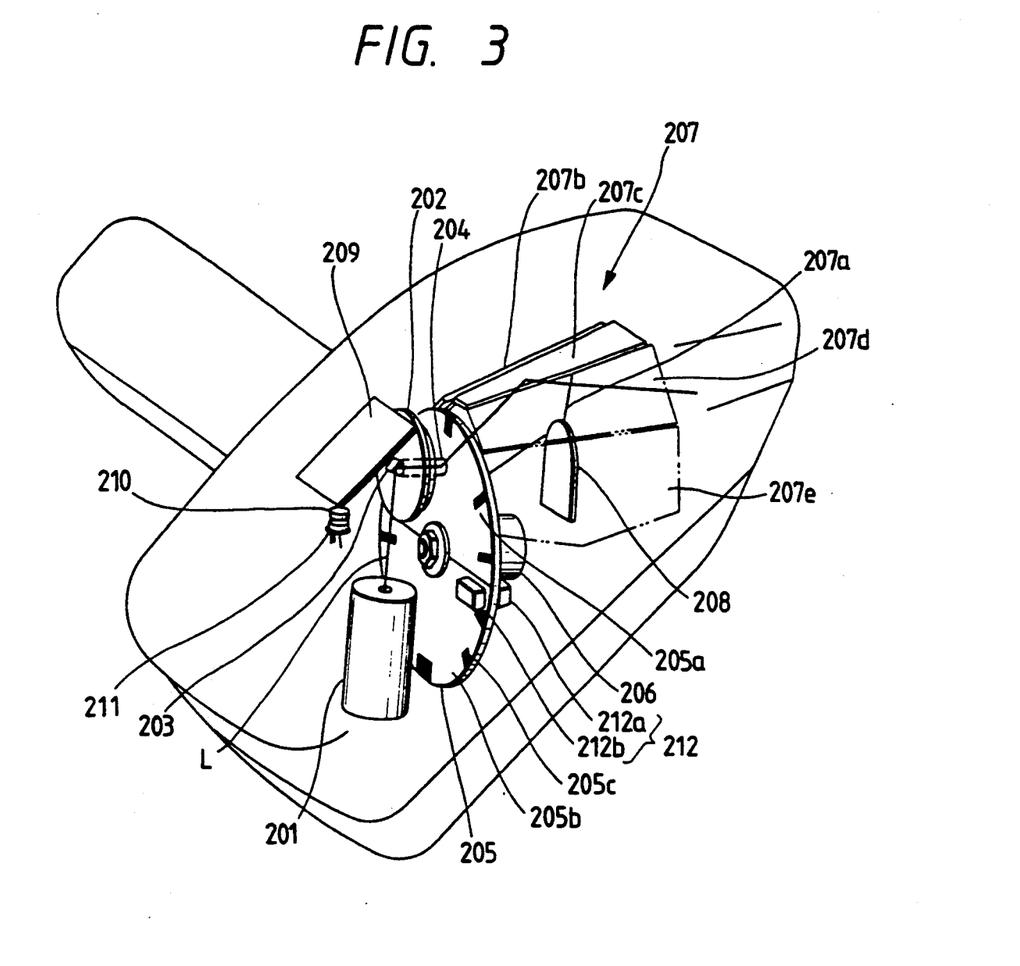
FIG. 3 is a schematic perspective view of some components of the scanning unit shown in FIG. 2.

The scanning unit 2 will be described in detail with reference to FIGS. 2 and 3. FIG. 2 shows the internal structure of the scanning unit 2 in vertical cross section, and FIG. 3 schematically shows an optical system of the scanning unit 2.

The casing 22 of the scanning unit 2 comprises an upper casing member 22a and a lower casing member 22b. The readout window 21 is defined in the lower casing member 22b. The upper casing member 22a has a display window 23 (FIG. 1).

The readout window 21 comprises a transparent glass sheet 21a fitted in an opening defined in the lower casing member 22b. The display window 23 comprises a colored transparent resin sheet fitted in an opening defined in the upper casing member 22a. Within the display window 23, there are disposed, as shown in FIG. 1, an LED 23a for indicating whether the power supply of the bar-code reader is switched on or off, and an LED 23b for indicating whether a bar code is successively read out or not.

As shown in FIG. 2, a chassis 200 which is positioned in the casing 22 is coupled to the second support post 33 through an extensible and contractable mechanism in the arm 24. The chassis 200 extends through the scanning unit 2 and serves as a mechanical framework for the scanning unit 2. The chassis 200 has a high degree of rigidity for stably and reliably supporting an optical system (described below).

A semiconductor laser beam source 201 for emitting a laser beam L is mounted on the chassis 200. The semiconductor laser beam source 201 comprises a semiconductor laser for emitting visible light and a lens system. The laser beam L, which is emitted from the semiconductor laser, is reflected by a reflecting mirror 203 on a condensing lens 202 mounted on the chassis 200, and passes through a light-shielding tube 204 to a hologram disc 205. The reflecting mirror 203 is attached to the end of the light-shielding tube 204 which is located at the center of the condensing lens 202. The reflecting mirror 203 is inclined at an angle of 45° to the axis of the light-shielding tube 204. The reflecting mirror 203 serves to reflect the laser beam L, which has been applied thereto through a recess 204a defined in the end of the light-shielding tube 204, into the light-shielding tube 204 in the axial direction thereof. The hologram disc 205 has first and second holograms 205a, 205b which have different focal lengths and diffraction angles, the first and second holograms 205a, 205b being formed respectively in angular ranges of 180°. The first and second holograms 205a, 205b serve to deflect and converge the applied laser beam.

The hologram disc 205 can be rotated by a motor 206 mounted on the chassis 200. When the hologram disc 205 rotates, the first and second holograms 205a, 205b diffract the laser beam L as it passes therethrough, and deflects the leaving laser beam L in a semicircular range of 180°.

The laser beam M which has left the hologram disc 205 is reflected by a polygonal reflecting mirror 207, which is supported on the chassis 200 and comprises five reflecting mirror facets 207a, 207b, 207c, 207d, 207e, and is then emitted out of the scanning unit 2 through the readout window 21.

The reflecting mirror facets 207a through 207e are fixed to a subchassis 200a which is detachably mounted on the chassis 200. The subchassis 200a with the polygonal reflecting mirror 207 can be replaced with another subchassis having a different polygonal reflecting mirror for a different scanning pattern and a different number of scanning lines. In this embodiment, polygonal reflecting mirrors with different numbers of reflecting mirror facets (ranging from 3 to 6 reflecting mirror facets) may be interchangeably used for different numbers of scanning lines and different scanning patterns.

The hologram disc 205 is fixedly mounted on the rotatable shaft of the motor 206, which is mounted on a motor base 206a secured to a subchassis 200b that is fixed to the chassis 200. The shaft of the motor 206 extends through the subchassis 200b, the motor base 206a, and a driver circuit substrate 206b which is mounted on the motor base 206a. The hologram disc 205 is housed in a circular cavity defined in the chassis 200 and covered with the subchassis 200b. The motor 206 comprises an outer-rotor motor, and mechanically supported, along with the motor base 206a and the driver circuit substrate 206b, on the subchassis 200b.

A light shield 208 extends from the subchassis 200b and is positioned in the polygonal reflecting mirror 207. The light shield 208 serves to block transmitted light and any other directly applied light which would otherwise travel directly to the hologram disc 205 without being reflected by the polygonal reflecting mirror 207.

As shown in FIG. 3, a photointerrupter 212 is supported on a portion of the chassis 200 which faces the hologram disc 205, the photointerrupter 212 comprising a light-emitting element 212a and a light-detecting element 212b that are disposed one on each side of the hologram disc 205. The hologram disc 205 has a plurality of angularly spaced marks 205c on its outer circumferential edge which correspond to starting and ending points of respective scanning lines. The starting and ending points of the scanning lines are detected when the marks 205c are detected by the photointerrupter 212. One of the marks 205c, which is shown at the lowermost end of the hologram disc 205 in FIG. 3, is wider than the other marks 205c. Therefore, one revolution of the hologram disc 205 can be detected when a pulse of longer duration corresponding to the wider mark 205c is first generated by the photointerrupter 212 after a preceding pulse of longer duration was generated.

When a laser beam spot which forms scanning patterns shown in FIG. 1 scans or moves across a bar code on an article or commodity, the bar code reflects light whose intensity depends on the reflectivities of bars and spaces between the bars of the bar code.

The light reflected from the bar code travels back to the readout window 21 along the same path as the laser beam L which has scanned the bar code. The reflected light which has passed through the readout window 21 is reflected by the same reflecting mirror facet (i.e., one of the facets 207a through 207e) as that which has reflected the scanning laser beam L, and applied to the hologram disc 205.

The reflected light is diffracted again by the first and second holograms 205a, 205b of the hologram disc 205, and converged by the condensing lens 202 which is fixed to the chassis 200. The converged light is then reflected by a reflecting mirror 209, passes through a bandpass filter 210 which allows only light of a certain wavelength to pass therethrough, and is focused on a photodetector 211. The photodetector 211 then generates an electric signal representing the bar code.

The reflecting mirror 209 is fixed to a subchassis 200c which is fixed to and extends from the chassis 200. The subchassis 200c covers the optical path extending from the condensing lens 202 through the reflecting mirror 209 to the photodetector 211, for thereby preventing any extraneous light from being applied to the photodetector 211.

The photodetector 211 and amplifier and driver circuits electrically connected thereto are mounted on a circuit substrate 211a which is fixed to the chassis 200.

The scanning unit 2 also includes circuit substrates 213, 214 housed in the casing 22 and supporting various circuits. The circuits supported on the circuit substrates 213, 214 include a driver circuit for driving a laser diode in the semiconductor laser beam source 210, a processing circuit for processing the signal from the photointerrupter 212, a driver circuit for driving the motor 206, an amplifier circuit for amplifying the signal from the photodetector 211, driver circuits for driving the LEDs 23a, 23b in the display window 23, and a power supply circuit. These circuits are electrically connected to the control circuit 4 through the cable 4a.

The indicator rod 50 is detachably mounted on the lower casing member 22b. The indicator rod 50 comprises a coil spring 51, a transparent light-emitting bulb or envelope 52 mounted on the tip end of the coil spring 51, and an externally threaded stud (attachment means) 54 supporting the other end of the coil spring 51 and threaded in the lower case member 22c. The transparent light-emitting envelope 52 houses or covers an LED 53 therein which is electrically connected to an electric circuit in the chassis 22 through a cable (not shown). The indicator rod 50 extends substantially parallel to the direction in which the laser beam L is transmitted from the scanning unit 2 through the readout window 21, so that the indicator rod 50 does not interfere with the transmitted laser beam L. The length of the indicator rod 50 is selected such that the tip end thereof, i.e., the transparent light-emitting envelope 52 is positioned slightly above and points to a central region of an area or zone in which the scanning unit 2 can read bar codes, and through which articles with bar codes should pass.

A process of reading a bar code with the optical system in the scanning unit 2, the electric circuit arrangement in the scanning unit 2, and the control circuit 4 will now be described below.

When the power supply of the bar-code reader is switched on with a power supply switch (not shown) by the operator, the power supply indicating LED 23a is energized, and the hologram disc 205 is rotated up to a speed at which it can scan a laser beam at a sufficiently high speed. When the hologram disc 205 reaches a steadily rotating condition, the semiconductor laser beam source 201 emits a laser beam L. If the rotational speed of the hologram disc 205 decreases, then the semiconductor laser beam source 201 is automatically de-energized thereby preventing the laser beam from being continuously applied to one spot for a long period of time.

The laser beam L is diffracted by the first and second holograms 205a, 205b and reflected by the polygonal reflecting mirror 207, into a scanning beam L which has a focal point that is spaced a certain distance from the read-out window 21.

As the hologram disc 205 rotates, the scanning beam L moves along scanning lines of a scanning pattern 220 shown in FIG. 1. When one of the scanning lines of the scanning pattern 200 traverses or moves across a bar code, the bar code produces light reflections corresponding to the bars and spaces between the bars of the bar code.

The reflected light returns to the hologram disc 205 along the same path as the scanning laser beam L, and travels through the condensing lens 202, the reflecting mirror 209, and the bandpass filter 210 and finally reaches the photodetetor 211. The photodetector 211 then generates an electric signal representing the bars and spaces of the bar code.

In response to the signal from the photointerrupter 212, the electric circuit arrangement of the scanning unit 2 produces timing signals indicating the starting and ending points of the respective scanning lines. The signal from the photodetector 211 is divided into and identified as signals corresponding to the reflections from the scanning lines, respectively, based on the timing signals. When a signal representing the bar code is thus produced, the information encoded into the bar code is decoded and outputted from the scanning unit 2 for display and entry into a master computer (not shown).

While the bar code is being thus read out, the operator can easily bring an article with a bar code into a bar code readout position or zone pointed by the indicator rod 50, in which position or zone the scanning unit 2 can reliably read out the bar code.

The LED 53 in the light-emitting envelope 52 can be energized at the same time the readout indicating LED 53 so that the operator can know that the bar code is successfully read by the scanning unit 2 by seeing the light-emitting envelope 52 when the LED 53 is energized.

When some hard object hits the coil spring 51, the coil spring 51 is resiliently flexed by the object. After the object has passed by, the coil spring 51 returns resiliently back to its original configuration. Therefore, both the coil spring 51 and the object are prevented from being damaged. The indicator rod 50 thus allows safe and reliable readout operation.

In the first embodiment described above, the LED 53 on the tip of the indicator rod 50 is energized when a bar code is read by the scanning unit 2. However, the LED 53 may be arranged such that it is energized only when the scanning unit 2 is ready for reading a bar code, or only when a reading error is caused thereby prompting the operator to try to have the bar code read again.

The indicator rod 50 may be attached to the casing 22 by any of various structures other than the structure shown in FIG. 2. For example, the indicator rod 50 may have a quick-connect terminal which is electrically connected to the LED 53, so that the LED 53 can be electrically connected to the electric circuit arrangement in the scanning unit 2 when the indicator rod 50 is installed on the casing 22 with the quick-connect terminal joined to a terminal on the casing 2.

The LED 53 may emit light of any color. The LED 53 may emit light of one color when the scanning unit 2 is in a standby condition and light of another color when it fails to read a bar code successfully. Furthermore, the LED 53 may emit light of a different color than the color of the light emitted by the semiconductor laser beam source 201 so that the light emitted by the LED 53 will not adversely affect the bar-code readout operation of the scanning unit 2.

Figure 4:
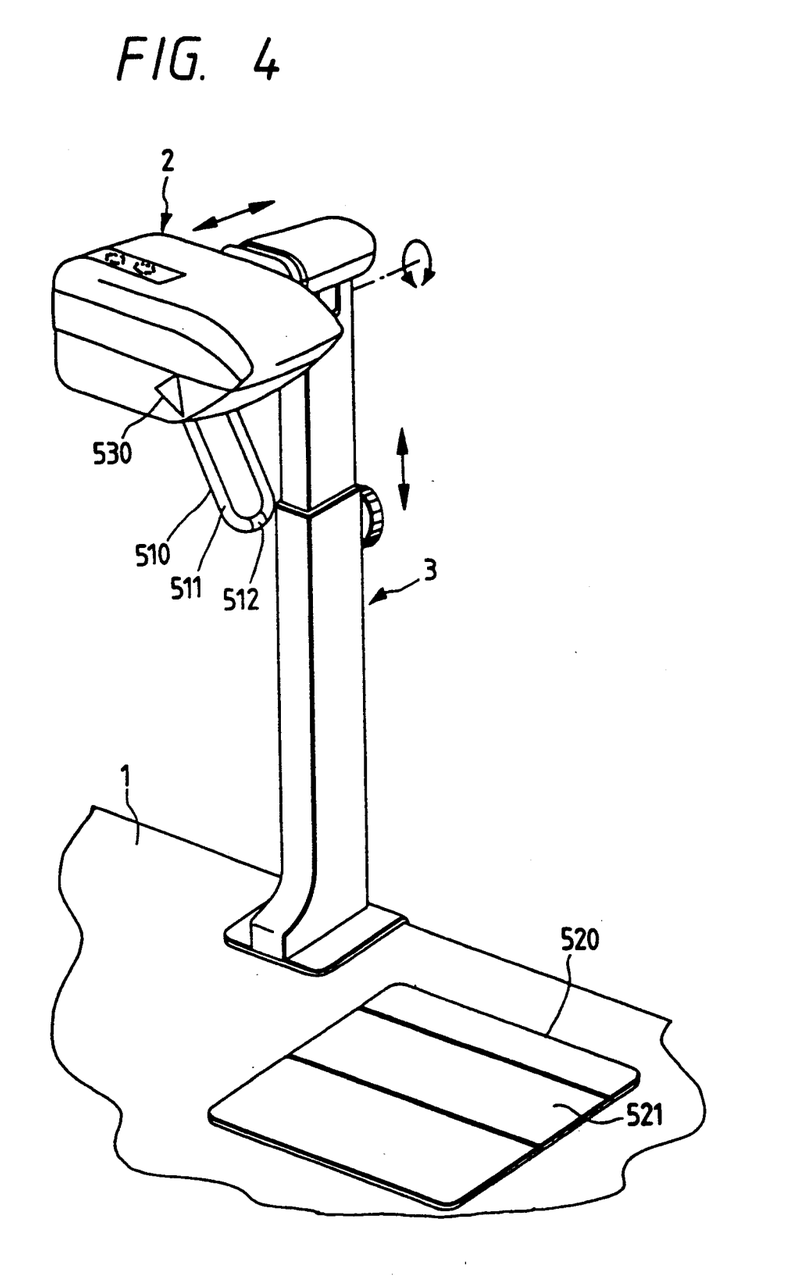
FIG. 4 is a perspective view of a bar-code reader according to a second embodiment of the present invention.

FIG. 4 shows a bar-code reader according to a second embodiment of the present invention.

As shown in FIG. 4, the bar-code reader has a scanning unit 2 which is of basically the same structure as that of the scanning unit 2 shown in FIGS. 1 through 3 except that the scanning unit 2 employs an indicator ring 510, instead of the indicator rod 50, and an arrow mark 530 marked on the casing. The bar-code reader shown in FIG. 4 additionally has a sheet 520 placed on the register counter table 1. The indicator ring 510, the arrow mark 530, and the sheet 520 serve to indicate a direction, a position, and a range or zone in which bar codes can be read by the scanning unit 2.

The indicator ring 510 has its tip pointing to the bar-code readout position, and the angle at which the indicator ring 510 is attached to the casing of the scanning unit 2 indicates the bar-code readout direction. The indicator ring 510 comprises a coil spring 511 including a colored portion 512 on its bent tip end. The indicator ring 510 is detachably mounted on the lower case member of the scanning unit casing.

The arrow mark 530 points to the direction in which the laser beam is transmitted from the scanning unit 2, i.e., the bar-code readout direction. The arrow mark 530 is applied to a side of the casing of the scanning unit 2 by means of an adhesive seal (not shown).

The sheet 520 is made of soft rubber and has a size covering the scanning pattern 220 shown in FIG. 1. The sheet 520 has a colored strip 521 extending along the direction in which an article with a bar code should be moved by the operator when the bar code is to be read. The colored strip 521 also serves to indicate an area or zone in which bar codes can be read by the scanning unit 2. The sheet 520 may be integrally formed with the register counter table 1.

The bar-code reader according to the second embodiment allows the operator to recognize the bar-code readout position, direction, and area or zone more clearly.

Figure 5:
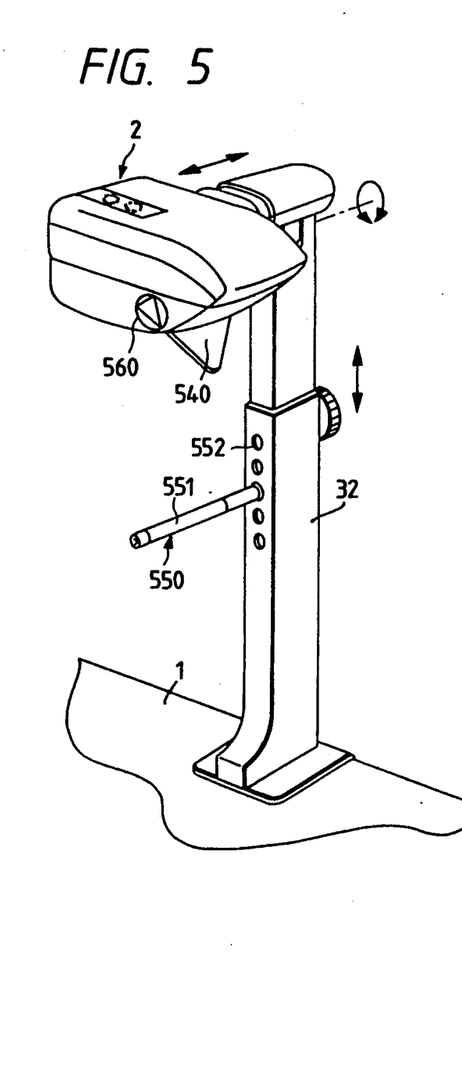
FIG. 5 is a perspective view of a bar-code reader according to a third embodiment of the present invention.

FIG. 5 shows a bar-code reader according to a third embodiment of the present invention.

The bar-code reader shown in FIG. 4 includes an indicator plate 540, instead of the indicator ring 510 shown in FIG. 4, a horizontal indicator rod 550 for indicating a height at which an article with a bar code should pass, and an arrow mark 560 applied to a side of the scanning unit casing by silk screen printing.

The indicator plate 540 is made of soft rubber and is detachably mounted on the lower casing member of the scanning unit casing. The indicator rod 550 is attached to the first support post 32, for indicating to the operator a height or vertical position above which an article with a bar code should pass. The indicator rod 550 has a colored strip 551 for indicating a range or zone through which such an article should pass. The indicator rod 550 may be selectively fitted endwise in one of attachment holes 552 defined in one side of the first support post 32 at vertically spaced intervals. Therefore, when the scanning unit 2 is vertically moved with respect to the register counter table 1, the indicator rod 550 may also be adjusted in vertical position.

The bar-code reader according to the third embodiment permits the operator to recognize the bar-code readout position, direction, and area or zone, and also to recognize the height of the bar-code readout position accurately.

Figure 6:
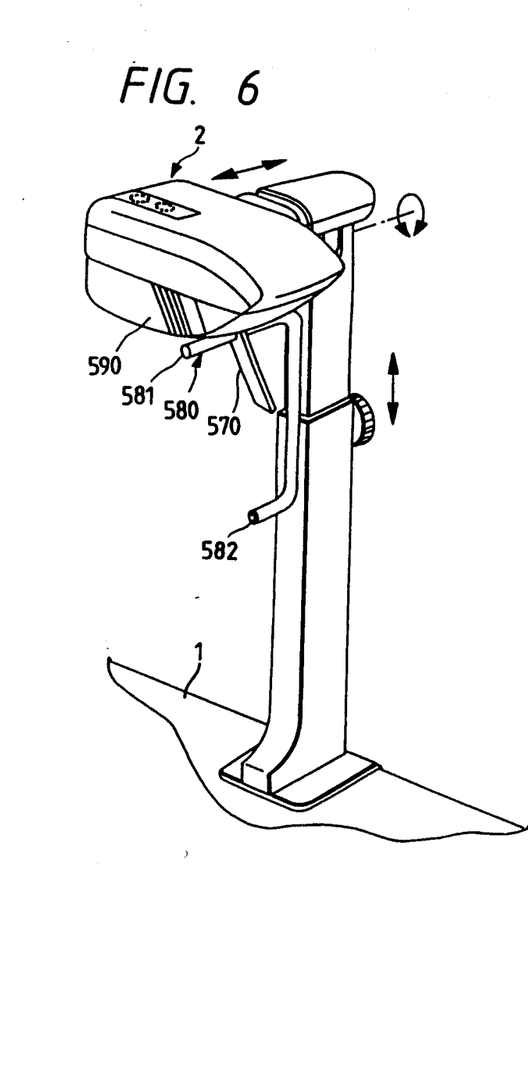
FIG. 6 is a perspective view of a bar-code reader according to a fourth embodiment of the present invention.

FIG. 6 shows a bar-code reader according to a fourth embodiment of the present invention. The bar-code reader shown in FIG. 6 includes an indicator plate 570, an indicator rod 580 for indicating an area or zone in which to pass an article with a bar code, and a pattern mark 590 for indicating a direction in which a bar code is read by the scanning unit 2.

The indicator plate 570 and the indicator rod 580 are integrally made of soft rubber and detachably mounted on the lower casing member of the scanning unit casing. The indicator rod 580 comprises a first indicator member 581 for indicating an upper limit of the area or zone in which to pass articles and a second indicator member 532 for indicating a lower limit of that area or zone.

The pattern mark 590 is applied to a side of the scanning unit casing by silk screen printing, and has its pattern inclined to indicate the direction in which bar codes are read by the scanning unit 2.

The bar-code reader shown in FIG. 6 allows the operator to recognize the bar-code readout position and direction and also the area or zone in which to pass articles with bar codes.

Since the upper limit of the zone in which to pass articles is indicated by the second indicator member 581, the operator is cautioned not to bring a bar code too closely to the readout window 21, and hence the danger of bar-code readout failures is reduced.

Each of the indicator ring 510 shown in FIG. 4 and the indicator rods 550, 580 shown respectively in FIGS. 5 and 6 may an LED identical to the LED 53 shown in FIG. 2.

Figure 7:
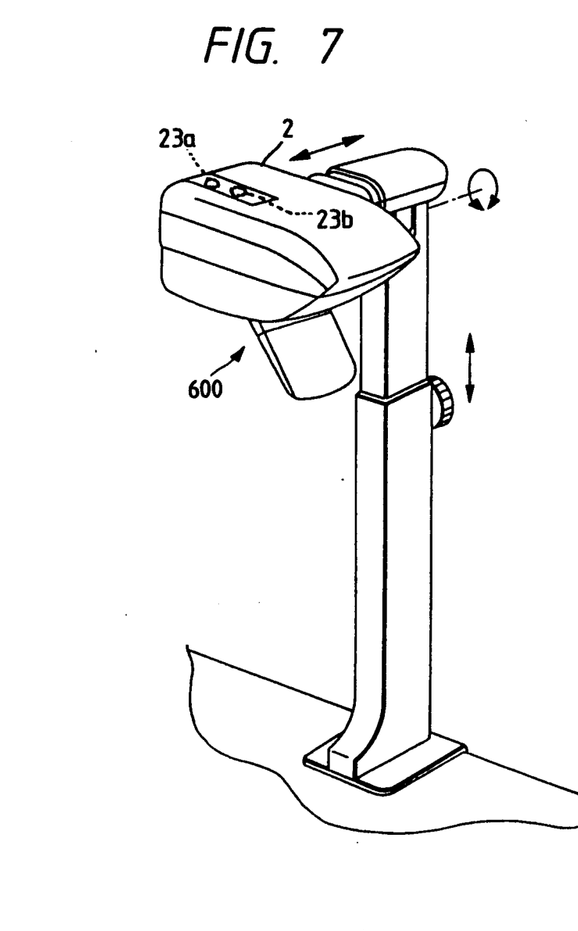
FIGS. 7 and 8 are perspective views of a bar-code reader according to a fifth embodiment of the present invention.
Figure 8:
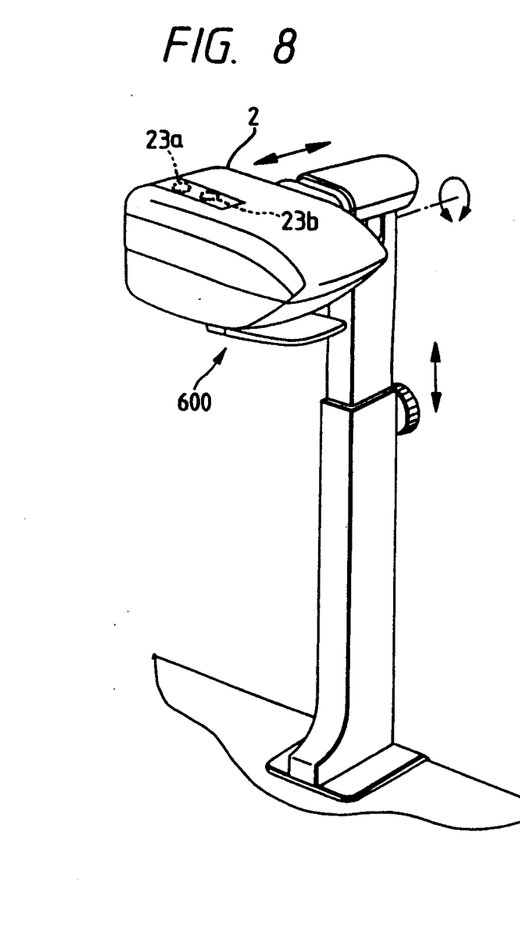

FIGS. 7 and 8 show a bar-code reader according to a fifth embodiment of the present invention.

According to the fifth embodiment, a movable indicator plate unit 600 is detachably mounted on the lower casing member of the scanning unit 2. When the scanning unit 2 is in a standby condition for reading bar codes, the movable indicator plate unit 600 is inclined downwardly as shown in FIG. 7, indicating the bar-code readout direction and position. When a bar code on an article has been read by the scanning unit 2, the movable indicator plate unit 600 is turned upwardly as shown in FIG. 8, allowing the article to pass easily and unobstructedly below the scanning unit 2.

Figure 9:
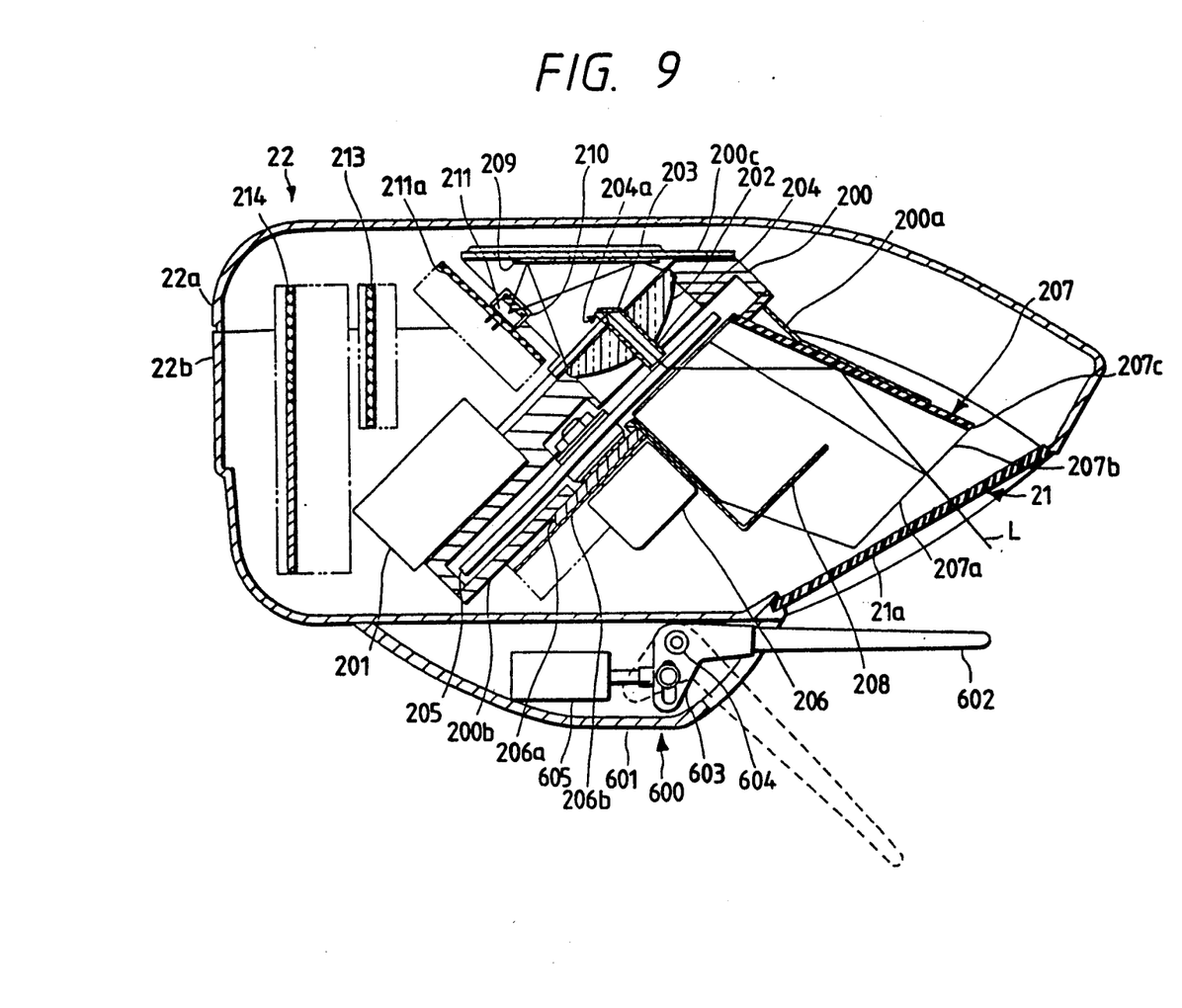
FIG. 9 is a cross-sectional view of a scanning unit of the bar-code reader shown in FIGS. 7 and 8.

The movable indicator plate 600 is shown in greater detail in FIG. 9.

The movable indicator plate unit 600 has a case 601 which is detachably fastened to the lower casing member 22b of the casing 22. The movable indicator plate unit 600 includes an indicator plate 602 movably mounted in the case 601, the indicator plate 602 being made of soft rubber. The indicator plate 602 is angularly movably supported at a crank 603 on a shaft 604 in the case 601 and normally urged upwardly (toward the solid-line position) by a torsion coil spring (not shown) disposed around the shaft 604 and engaging the indicator plate 602. The crank 603 of the indicator plate 602 is operatively coupled to a solenoid actuator 605 disposed in the case 601. When the solenoid actuator 605 is energized, it causes the crank 603 to move the indicator plate 602 angularly downwardly (toward the dotted-line position). The solenoid actuator 605 is electrically connected through a connector to the driver circuit for the readout indicating LED 23b, such that the solenoid actuator 605 can be energized when the LED 23b is de-energized, i.e., when the scanning unit 2 is in a standby condition for reading a bar code.

The movable indicator plate unit 600 may be arranged such that after a bar code has been read, the indicator plate 602 is turned in the opposite direction toward a position which is 180° spaced from the solid-line position shown in FIG. 9. This arrangement allows the article to pass more easily and unobstructedly below the scanning unit 2.

The movable indicator plate unit 600 indicates the bar-code readout position and direction. Moreover, since the indicator plate 602 is turned upwardly after a bar code has been read, the operator can immediately know when to pass the article by watching the indicator plate 602.

With the various embodiments of the present invention described above, the operator can bring an article with a bar code reliably into a position where the scanning unit 2 can read the bar code, the bar code can be read out at a higher rate with less readout failures or errors.

If the bar code on an article is not read when the operator passes the article, and the readout indicating LED 23b is not energized or an alarm buzzer indicating a readout failure or error is energized, then the operator is not required to pass the article again, but is required only to move the article to the indicated bar-code readout position.

The indicator rod, the indicator ring, the arrow mark, the sheet, and the pattern mark, disclosed in the various embodiments, may be used for only training purpose, and may be removed after the operator becomes accustomed to the bar-code readout process using the bar-code reader.

Although certain preferred embodiments have been shown and described, it should be understood that many changes and modifications may be made therein without departing from the scope of the appended claims.

What is claimed is:

1. An overhead bar code reader for reading a bar code to an article comprising:
   a scanning unit which comprises:
   a vertical support with a path along which the article is to be moved being defined on one side thereof;
   scanning means supported on said support above said path, for emitting a scanning light beam to optically scan the bar code toward said path and deflecting the scanning light beam along a predetermined scanning pattern; and
   detecting means for detecting light reflected by the bar code which is optically scanned by the scanning light beam while the article is being moved along said path; and
   indicating means, mounted on said scanning unit, for indicating a zone through which the article is to be moved along said path, said indicating means being positioned for possible contact with the article, said indicating means being flexible along said path so that when said indicating means is hit by the article, the indicating means is flexed by the article, and thereafter the indicating means is restored to the original position.

2. An overhead bar-code reader according to claim 1, wherein said scanning means has a casing mounted on said support, said indicating means comprising an indicator rod extending substantially parallel to the scanning light beam emitted from said scanning means.

3. An overhead bar-code reader according to claim 2, wherein said indicating means comprises a coil spring detachably fastened to said casing and light-emitting means mounted on a tip end of said coil spring, for emitting light in response to an operation of said detecting means.

4. An overhead bar-code reader according to claim 3, wherein said light-emitting means comprises a light-emitting diode and a transparent envelope covering said light-emitting diode.

5. An overhead bar-code reader according to claim 1, wherein said scanning means has a casing mounted on said support, said indicating means comprising an indicator ring extending substantially parallel to the scanning light beam emitted from said scanning means.

6. An overhead bar-code reader according to claim 5, wherein said indicator ring comprises a coil spring detachably mounted on said casing, said coil spring having a colored portion on a bent tip end thereof.

7. An overhead bar-code reader according to claim 5, wherein said indicating means further includes an arrow mark attached to said casing and pointing to said zone.

8. An overhead bar-code reader according to claim 5, wherein said indicating mean further includes a sheet positioned with respect to said support and having a colored strip extending along said path.

9. An overhead bar-code reader according to claim 1, wherein said scanning means has a casing mounted on said support, said indicating means comprising an indicator plate extending substantially parallel to the scanning light beam emitted from said scanning means.

10. An overhead bar-code reader according to claim 9, wherein said indicator plate is made of soft rubber and detachably mounted on said casing.

11. An overhead bar-code reader according to claim 9, wherein said indicating means further includes an arrow mark attached to said casing and pointing to said zone.

12. An overhead bar-code reader according to claim 9, wherein said indicating means further includes an indicator rod mounted on said support for indicating a vertical position above which the article is to be moved through said zone, said indicator rod having a colored strip for indicating said zone.

13. An overhead bar-code reader according to claim 12, wherein said support has an array of vertically spaces holes, said indicator rod being fitted endways in a selected one of said holes.

14. An overhead bar-code reader according to claim 9, wherein said indicating means further includes a pattern mark attached to said casing and pointing to said zone.

15. An overhead bar-code reader according to claim 9, wherein said indicating means further includes an indicator rod mounted on said casing for indicating upper and lower positions between which the article is to be moved through said zone.

16. An overhead bar-code reader according to claim 1, wherein said scanning means has a casing mounted on said support, said indicating means comprising a movable indicator plate unit which extends substantially parallel to the scanning light beam emitted from said scanning means while the scanning light beam is being emitted from said scanning means.

17. An overhead bar-code reader according to claim 16, wherein said movable indicator plate unit comprises a case detachably mounted on said case, an indicator plate of soft rubber which is angularly movably supported in said case, and an actuator operatively coupled to said indicator plate, for angularly moving said indicator plate so as to point to said zone while the scanning light beam is being emitted from said scanning means.

18. An overhead bar-code reader according to claim 1, wherein said vertical support is vertically extensible and contractable, further including an arm by which said scanning means is mounted on said support, said arm being horizontally extensible and contractable to move said scanning means away from and toward said support, said scanning means being angularly movable about an axis transverse to said vertical support.

19. An overhead bar-code reader according to claim 1, wherein said scanning means has a replaceable polygonal reflecting mirror system which determines both the number of scanning lines and the formation of different scanning patterns.

20. An overhead bar-code reader according to claim 1, wherein said indicating means is detachably mounted on said scanning unit.

21. An overhead bar-code reader for reading a bar code attached to an article, comprising:
   a scanning unit which comprises:
      a vertical support with a path along which the article is to be moved being defined on one side thereof;
      scanning means supported on said support above said path, for emitting a scanning light beam to optically scan the bar code toward said path and deflecting the scanning light beam along a predetermined scanning pattern; and
      detecting means for detecting light reflected by the bar code which is optically scanned by the scanning light beam while the article is being moved along said path; and
      ring-shaped indicating means, mounted on said scanning unit, for indicating a zone through which the article is to be moved along said path, said ring-shaped indicating means being positioned for possible contact with the article.

22. An overhead bar-code reader according to claim 21, wherein said scanning means has a casing mounted on said support, said ring-shaped indicating means comprising an indicator ring extending substantially parallel to the scanning light beam emitted from said scanning means.

23. An overhead bar-code reader according to claim 22, wherein said indicator ring comprises a coil spring detachably mounted on said casing, said coil spring having a colored portion on a bent tip end thereof.

24. An overhead bar-code reader according to claim 22, wherein said ring-shaped indicating means further includes an arrow mark attached to said casing and pointing to said zone.

25. An overhead bar-code reader according to claim 22, wherein said ring-shaped indicating means further includes a sheet positioned with respect to said support and having a colored stripe extending along said path.

26. An overhead bar-code reader according to claim 21, wherein said scanning means has a replaceable polygonal reflecting mirror system which determines both the number of scanning lines and the formation of different scanning patterns.

* * * * *